UNITED STATES PATENT OFFICE.

JOSEF FRANZ BACHMANN AND ADOLF VOGT, OF VIENNA, AUSTRIA-HUNGARY, ASSIGNORS OF TWENTY-ONE TWENTY-FIFTHS TO JOSEF KIRCHNER, ALBERT KÖNIG, CARL CAMILLO WEINER, AND ALEXANDER JÖRG, OF SAME PLACE.

MANUFACTURE OF ELECTRICAL RESISTANCES.

SPECIFICATION forming part of Letters Patent No. 642,414, dated January 30, 1900.

Application filed October 8, 1897. Serial No. 654,560. (No specimens.)

*To all whom it may concern:*

Be it known that we, JOSEF FRANZ BACHMANN and ADOLF VOGT, subjects of the Emperor of Austria-Hungary, residing at Vienna, in the Province of Lower Austria, in the Empire of Austria-Hungary, have invented certain new and useful Improvements in Electrical Resistances; and we do hereby declare the following to be a full, clear, and exact description of the invention, such as will enable others skilled in the art to which it appertains to make and use the same.

Our invention relates to the manufacture of an electrical-resistance material capable of application in a variety of ways for regulating electrical currents and for the conversion of electrical energy into heat.

According to our present invention an intimate mixture in a finely-divided state of a non-conductor and a conductor is worked with water into a paste or dough, from which by molding, or by casting or otherwise—as, for example, after the manner in which potters' clay is handled—an article of the shape which it is desired the resistance-body should possess is made. Such article after being dried is embedded in pulverized carbon and heated to a high temperature. For this purpose the article and the carbon in which it is embedded are placed in a suitable box or vessel which, except as hereinafter mentioned, is closed airtight and is heated in an oven either specially constructed for the purpose or in a potter's kiln. The non-conductor may be any artificial stone, clay, cement, porcelain, magnesia, or any refractory metallic oxid or mineral substance which in the process of manufacture of the resistance material does not suffer change. The conductor may be carbon in the form, for example, of graphite or powdered coke or a material—such as asphalt, tar, sugar, cellulose, or bone-meal—which by heating is carbonized, or a conductive metal or any metallic compound which in the process of manufacture of the resistance material is converted into a conductive metal otherwise than by reduction—*i. e.*, otherwise than by simple abstraction of oxygen. The proportions in which the constituents of the resistance material are mixed will depend, of course, upon the resistance desired and may vary within very wide limits. In case asphalt or tar is used the mixing of the same with the non-conductor is carried out under application of heat, the temperature being raised until the mixture ceases to become softer by further heating. In such case, too, the precaution should be taken when heating embedded in carbon to carefully and slowly raise the temperature and to provide means for the disengaged gas to escape by using for the box or vessel containing the article embedded in carbon a cover which, although fitting fairly well, does not close the same air-tight. When a conductive material other than tar or asphalt is used, it is preferable to allow the paste or dough to stand some months before molding or otherwise converting it into the shape desired. Inasmuch as the resistance of metal increases with the temperature, whereas the resistance or carbon decreases with a rise of temperature, a material whose specific resistance remains approximately constant for a considerable range of temperature may be obtained.

In applying our invention to the production of such a material a non-conductor of the nature hereinabove referred to is intimately mixed in a finely-divided condition with graphite and a metallic powder. The quantities of the graphite and metallic powder one to another must be proportioned with a view to obtaining the desired result at the desired temperature. The exact proportion in which the graphite and metallic powder should be used cannot be given, because, among other reasons, the conductivity of different samples of graphite varies considerably. However, two or three experiments will determine in what proportion any particular sample of graphite and any particular metal should be used in order to prepare a material whose resistance shall at the desired temperature be approximately constant. The mixture is worked up and formed into resistance material, as above stated.

In the production of resistances to be highly heated we use as a conductor a metal or combination of very refractory metals—as, for instance, silicium or silicium and chromium. Inasmuch as silicium is a conductor only when in a crystalline state and in view of the fact that crystallized silicium cannot be pulverized we employ amorphous silicium, and as a non-conductor or insulating material we combine or mix with these metals highly-refractory metallic oxids, as the oxids of the group of rarer earths. By subjecting the body compounded of these materials to a very high temperature the non-conductive amorphous silicium is converted into conductive crystalline silicium.

Obviously the conductivity of the resistance may be greatly varied by using alloys of metals, and as the alloy itself cannot be properly mixed with the non-conductor we use the oxids of the desired metals or the salts of the latter—as, for instance, of tin and copper—in solution, which solution is then evaporated, and the salts thus obtained in a finely-divided state are mixed with the non-conductor, the mixture being converted into a paste by means of a suitable liquid, generally water. When such a body is embedded in carbon and subjected to the required temperature, a conductive alloy is formed and intimately combined with the non-conductor.

The resistance material manufactured according to our invention is sufficiently compact to allow of its being polished, cut, turned, filed, bored, or provided with screw-threads. It may also, if desired, be galvanized, glazed, or enameled.

As is well known, all carbonaceous bodies or bodies containing carbon cannot be heated to a temperature above 500° centigrade without giving up carbon, first from the surface and gradually from the interior of the body.

In order to obtain a solid body which shall always have the same resistance, the baking should be carried out under a given temperature.

Inasmuch as there is no non-conductive material adapted to be mixed with carbon which will become sufficiently tenacious or solid at a temperature of or below 500° centigrade, it is obviously necessary to resort to higher temperatures—i. e., to temperatures at which a loss of carbon would take place. Furthermore, it is practically impossible to obtain a uniform temperature at all points within a heated space; hence the necessity of resorting to a temperature corresponding with a maximum temperature attainable within a given space or a temperature considerably greater than that actually required. This temperature depends, of course, on the nature of the fuel used and the amount of air supplied, and besides this it is necessary to secure a uniformly high temperature throughout the space heated. We therefore prefer to bake the resistances in an ordinary potter's or porcelain kiln, which will answer every requirement. These kilns are usually heated with coal, giving a long flame to a temperature of from 1,200° to 1,400° centigrade, though we prefer to heat with regenerator-gases to a temperature of about 1,800° centigrade or above. If a resistance compounded in accordance with our invention were baked in such a temperature without embedding it in carbon, the following would occur. Should the resistance be inclosed in a muffle that is not air-tight, a greater or less quantity of the carbon in the resistance would be burned out or gasified, according to the length of exposure and according as the muffle is heated by an oxidizing or a reducing flame, so that after baking the resistance of the body would differ very materially from that which it should possess, the percentage of carbon gradually increasing from the surface to the center of the resistance-body. The same will occur if the resistance is baked in an air-tight muffle, the carbon given off depositing on the muffle-walls, and this would also be the case if the resistance were baked in the flame of a neutral gas.

As the resistance will be richer in carbon internally than on the surface and as the conductivity of the resistance depends upon the percentage of carbon, it would be impossible to provide the same with proper contacts. The use of trailing contacts or brushes would, in fact, be impossible. The greater part of the current would of course find its way through that portion of the resistance richest in carbon—namely, through its interior—where the development of heat would first take place, and expansion from within and disruption or cracking of the resistance would unavoidably ensue and render the resistance useless. These facts have been fully proven by experience. If, on the other hand, the baking were carried out in a hydrocarbon atmosphere or in an atmosphere of carbon only, the reverse would take place in that a pure carbon would be deposited upon the resistance-surfaces, as is the case in carbonizing incandescible filaments. In this case the outer shell of carbon will then act as a conductor for the current, the properties of the resistance being illusory or practically destroyed. All these phenomena, oxidation, and precipitation of the conductive material will take place wholly or partially, according to the conductive material selected, even when the latter is a metal; but there is a further impossibility to obtain serviceable resistances of the composition herein described by baking in muffles or on the open hearth in that at the temperatures to which these resistances must be subjected they will crack or fissure wherever the carbon has been vaporized or burned out, because the action of the heat upon the non-conductive material is excessive at those points. Besides this the heating of the resistances is not a uniform one, because the heated air alone gives up its heat to the body. These difficulties are obviated by our process in that the resistance is completely embedded in solid carbon which contains but a small percentage of carbon vaporizable at the temperatures resorted to, and, as is well known, this carbon is but a medium conductor of heat; hence transmits the heat gradually and uniformly to the resistance-body embedded therein.

In view of the fact that the resistance is always poorer in carbon than its surrounding material some of the carbon of the latter material is taken up by the resistance, and this is of the greatest importance in the practical use, either as rheostats or heating media, of these resistances, in that they become somewhat more conductive outwardly, so that when momentarily highly taxed they become at once uniformly heated, and hence do not crack or fissure, while good durable contacts can be readily secured thereto, and practical experience has shown that a resistance of forty millimeters can be heated to a glowing heat within a fraction of a second and that when so repeatedly heated no structural changes are perceptible. Careful measurements have shown that the resistance of these bodies is reduced about five per cent. when carbon from without is absorbed thereby, whether such bodies have a high or low specific resistance. The relative change takes place imperceptibly and is influenced only to a small degree by the cross-sectional area of the body.

Having thus described our invention, what we claim as new therein, and desire to secure by Letters Patent, is—

1. The process of manufacturing electrical-resistance materials, which consists in forming a plastic mass from a mixture of a conductor and a non-conductor of electricity, molding or otherwise converting the compound into the shape desired, drying, and embedding the dried article in carbon and heating it to a high temperature, substantially as described.

2. The process of manufacturing resistance materials having an approximately invariable degree of conductivity at considerably great variations of temperature, which consists in forming a plastic mass from a mixture of a non-conductor of electricity, graphite and a metallic powder, molding or otherwise converting the compound into the desired shape, drying, and embedding the dried article in carbon and heating it to a high temperature, substantially as described.

3. The process of manufacturing electrical-resistance materials, which consists in forming a plastic mass from a mixture of a non-conductor of electricity and a carbonizable substance, molding or otherwise converting said mass into the desired shape, drying, and embedding the dried article in carbon and heating to a high temperature, for the purpose set forth.

4. The process of manufacturing resistance materials, which consists in forming a plastic mass from a mixture of a conductor and a non-conductor of electricity and of a metallic compound convertible into a conductive metal, forming or otherwise converting the mass into the desired shape, drying, and embedding the article in carbon and heating it to a high temperature, substantially as described.

5. The process of manufacturing resistance materials, which consists in intimately mixing a highly-refractory oxid or oxids of a metal, as those of the rarer earths, with metal or metals difficult of fusion, as silicium, or silicium and chromium, mixing the silicium in an amorphous state with the non-conductor or with the latter and the chromium, forming a plastic compound therewith, converting the same into the desired shape, drying, embedding in carbon and heating the shaped article to a temperature sufficient to convert the amorphous silicium into crystalline silicium, for the purpose set forth.

6. The process of manufacturing resistance materials, which consists in mixing oxids or salts of conductive metals with a non-conductive material, forming a plastic compound therewith, shaping the same, drying, embedding in carbon and heating the article to a temperature sufficient to alloy the oxids or salts, for the purpose set forth.

In testimony whereof we affix our signatures in presence of two witnesses.

JOSEF FRANZ BACHMANN.
ADOLF VOGT.

Witnesses:
CHAS. E. CARPENTER,
DAVID ALBIN.